Feb. 20, 1973    B. G. ROTHSCHILD    3,717,216
VEHICLE RESTRAINT ASSEMBLY
Filed Nov. 3, 1971    3 Sheets-Sheet 1
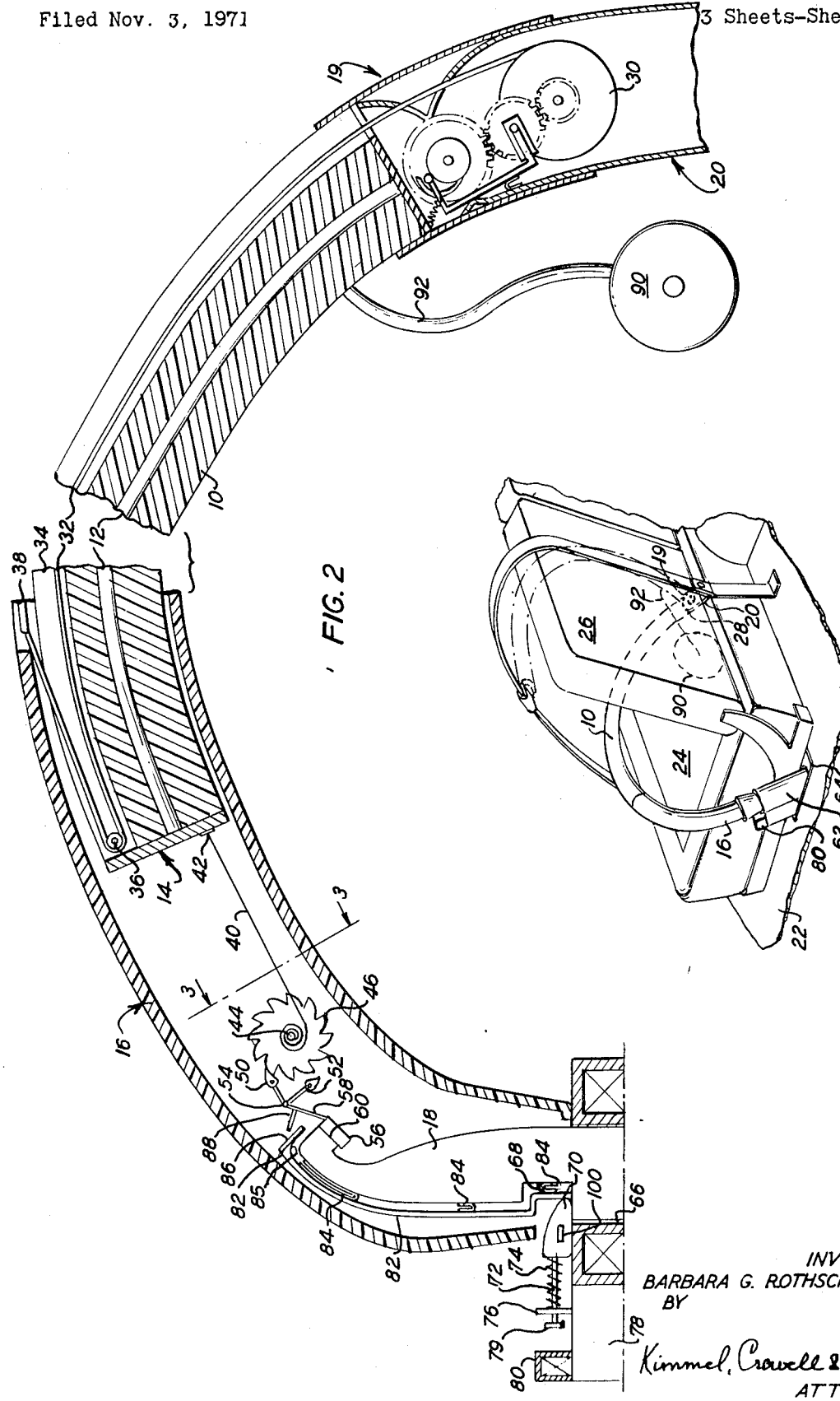
INVENTOR
BARBARA G. ROTHSCHILD
BY
Kimmel, Crowell & Weaver
ATTORNEYS Feb. 20, 1973   B. G. ROTHSCHILD   3,717,216
VEHICLE RESTRAINT ASSEMBLY
Filed Nov. 3, 1971   3 Sheets-Sheet 2

INVENTOR.
BARBARA G. ROTHSCHILD
BY
Kimmel, Crowell & Weaver
ATTORNEYS

United States Patent Office 3,717,216
Patented Feb. 20, 1973

3,717,216
VEHICLE RESTRAINT ASSEMBLY
Barbara G. Rothschild, 2134 Springdale Drive,
Columbus, Ga. 31906
Filed Nov. 3, 1971, Ser. No. 195,297
Int. Cl. B60r 21/10
U.S. Cl. 180—82 C                   11 Claims

ABSTRACT OF THE DISCLOSURE

A restraint formed of a pair of sections that are relatively movable towards and away from each other between a contracted and an expanded position with both sections being movable between an open and a closed position. A tongue coacts with the restraint to lock the restraint in closed and contracted position. The restraint is restrained from expansion when in its closed position. The movement of the tongue to release the restraint for opening movement also operates a mechanism to release the restraint for expansion.

BACKGROUND OF THE INVENTION

In my pending application Ser. No. 161,180, filed July 9, 1971, there is disclosed a restraint, for holding a vehicle occupant in place in a seat, that is formed of a pair of sections that are movable as a unit between an open and a closed position and that are relatively movable with respect to each other betwen a contracted and an expanded position. The restraint is held in closed and contracted position, in response to the closing of the vehicle ignition switch, when in use and, at that time, is restrained against expansion. When the vehicle ignition switch is turned off, the restraint may move from closed to open position and may also expand.

It has been found desirable in a restraint of this type to release the restraint for opening and expansive movement independently of the vehicle electrical system that is operated by the ignition switch. This is a desirable safety feature in the event of a failure in the vehicle electrical system and is also deemed to be a desirable quality in the eyes of manufacturers.

SUMMARY OF THE INVENTION

This invention is concerned with a restraint of the type discussed above in which the restraint is held in closed and contracted position, solely or partially, by a tongue that engages the restraint. The placement of the tongue in a position to lock the restraint renders effective a restraining device that inhibits expansion of the restraint. When the tongue is caused to disengage the restraint, so as to allow the restraint to open, a mechanism of this invention renders the restraining device ineffective so that the restraint may expand.

BRIEF DESCRIPTION OF THE DRAWING

FIG. 1 is a perspective view of the restraint in a vehicle;

FIG. 2 is a longitudinal section of the restraint in its closed and contracted position;

DESCRIPTION OF THE PREFERRED EMBODIMENTS

Figure 3:
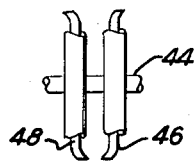
FIG. 3 is a view taken on the line 3—3 of FIG. 2.

Referring to FIGS. 1 and 2, the restraint comprises an arcuate bar-like body section 10 of a tough semi-rigid material, preferably reinforced by an internal cable 12 having a rigid head or cap 14 bearing against the forward end of the body portion 10. Engageable telescopically over the bar-like body section 10 is an arcuate sleeve section 16 of similar semi-rigid material and having fixedly mounted in its inner end and projecting therebeyond a lock prong 18 formed of soft magnetic material. The sections 10 and 16 are preferably formed of a nylon-like plastic or equivalent material, whereas the prong 18 is essentially iron.

The restraint embodies a hinge 19 at its end remote from the prong 18, and this hinge comprises a rigid housing 20, pivoted to the body section 10. The housing 20 is firmly anchored to a vehicle floor 22 at the rear of a vehicle seat 24 having a seat back 26. The hinge housing 20 is shaped to project into the space between the rear edge of the seat 24 and the bottom edge of the seat back 26, this portion of the hinge housing being indicated at 28 in FIG. 1, well out of the way of an occupant using the seat 24.

The hinge connection between the housing 20 and the body section 10, which is shown in detail in the aforementioned application, includes a pulley 30 rotatably mounted to the housing 20. A flexible cable 32, wound on the pulley 30, extends through a groove 34 formed longitudinally in the body section 10 and is trained about a small sheave 36 at the forward end of the body section 10. From the sheave 36, the cable 32 extends rearwardly and is anchored at 38 to the rear of the sleeve section 16. It may be seen that winding up the cable 32 by the pulley 30 will cause the sleeve section 16 to be extended relative to the body section 10.

Figure 4:
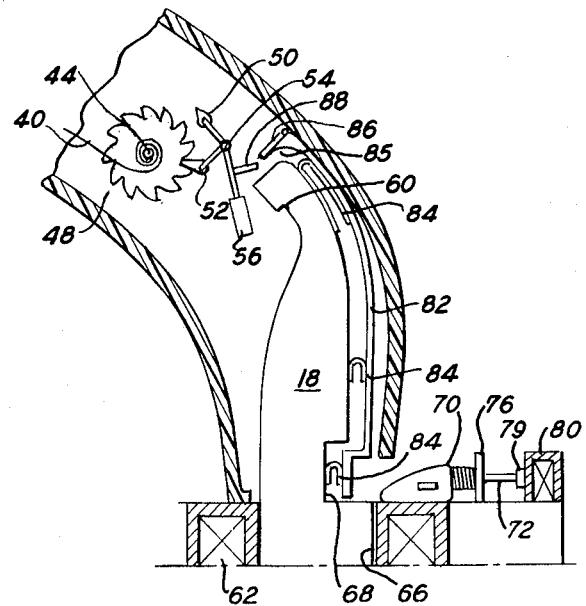
FIG. 4 is a section of a portion of the restraint after it has been released for expansive movement.

A clock-type spring 40 has one end attached at 42 to the head or cap 14 and its other end secured to and wound around a shaft 44 that extends across and is rotatably mounted to the sleeve section 16. Ratchet wheels 46 and 48, having teeth facing in opposite directions, are mounted to the shaft 44 for rotation therewith. A pair of pawls 50 and 52, spaced apart approximately 90°, are rigidly mounted to a rocker shaft 54 that extends across and is rotatably mounted to the sleeve section 16. The pawl 50 is engageable with the ratchet wheel 46 to thereby prevent its counterclockwise rotation as seen in FIG. 2 and the pawl 52 is engageable with the ratchet wheel 48 to prevent its counterclockwise rotation as seen in FIG. 4 and clockwise rotation as seen in FIG. 2. A weighted element 56 of soft magnetic material is connected by an arm 58 to the rocker shaft 54 and when drawn magnetically towards the opposing face 60 of the prong 18 will shift the pawl 50 into engagement with the ratchet wheel 46. When no magnetic field is induced in the prong 18 and the weight 56 falls away from the face 60, the pawl 50 will be disengaged from the ratchet wheel 46 and the pawl 52 will engage the ratchet wheel 48 as seen in FIG. 4.

As shown in FIG. 1, an electromagnet 62 is firmly anchored by a foot plate 64 to the vehicle floor 22. The electromagnet 62 has a socket 66 (FIG. 2) adapted to receive the magnetic prong 18. A recess 68 in the prong 18 is adapted to receive a tongue 70. The tongue 70 is mounted to a headed bolt 72 made of a soft magnetic material. The tongue 70 is yieldably urged inwardly towards the prong 18 by a spring 74 interposed between the tongue 70 and a finger 76 in which the bolt 72 is slidable. The finger 76 is mounted to a frame 78 that is secured to the electromaget 62. The head 79 of the bolt 72 bearing against the finger 76 limits the extent that the spring 74 may move the tongue 70 towards the prong 18. An electromagnet 80 is located outwardly of the bolt 72.

Figure 5:
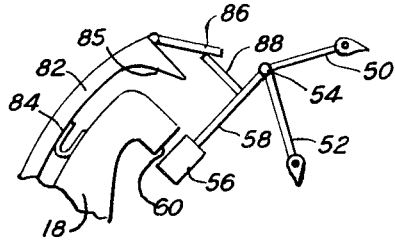
FIG. 5 is a section of a portion of the restraint showing it about to be inhibited against expansion.

An arm 82 is located outwardly of the prong 18 with its lower end in alignment with the tongue 70. The arm 82 is mounted to the prong 18 by a plurality of leaf springs 84 which yieldably urge the arm 82 away from the prong 18. As seen particularly in FIG. 5, an inwardly extending lug 85 is secured to the top of the arm 82 above the prong 18. An inwardly extending leaf 86 is hinged to the arm 82 above the lug 85 for movement towards and away from the lug 85, the leaf 86 extending inwardly of the lug 85. The leaf 86, when the arm 82 is urged towards the prong 18 as explained below, is in intersecting relationship with a finger 88 that is secured to the arm 58.

When the vehicle is standing idle with its electrical system deenergized, the restraint will be in its open inactive position shown in phantom in FIG. 1. In this position, by the mechanism shown in the aforementioned application, the cable 32 has been wound on the pulley 30 so that the sleeve section 16 and the body section 10 are in relatively extended relation with the spring 40 under tension. In this position, the pawl 52 is bearing against the ratchet wheel 48 as indicated in FIG. 4. When an occupant enters the vehicle and sits on the seat 24, he will apply pressure to a plate 90 (FIG. 1) to tension a flexible element 92, as explained in the aforementioned application, to automatically swing the restraint into closed position wherein the prong 18 enters the electromagnet 62, as shown in FIG. 2, with the tongue 70 engaged in the recess 68 to hold the restraint in closed position until it is firmly locked in position by the electromagnet 62 as described below. The movement of the tongue 70 into the recess 68, under the influence of the spring 74, moves the arm 82 towards the prong 18 against the forces of the springs 84 to place the leaf 86 in intersecting relationship with the finger 88.

Figure 6:
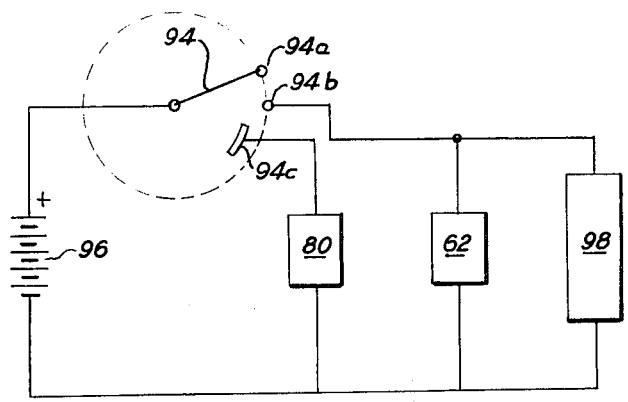
FIG. 6 is a schematic representation of an electrical circuit for operating the restraint.

Referring to FIG. 6, the ignition switch 94 of the vehicle is a rotary switch so constructed as to move clockwise as seen in FIG. 6. The switch 94 has an "off" terminal 94a, an "on" terminal 94b, and an arcuate terminal 94c for energizing the electromagnet 80. When the ignition switch 94 is turned clockwise by the occupant from its "off" terminal 94a to its "on" terminal 94b to place the vehicle battery 96 in series with the vehicle electrical system 98 to start the vehicle, the electromagnet 62 is energized to thereby magnetize the prong 18 and lock the prong 18, together with the restraint, in closed position by magnetic attraction. The magnetization of the prong 18 causes the weighted element 56 to swing from the FIG. 4 position to the FIG. 2 position towards and against the prong face 60 thereby disengaging the pawl 52 from the ratchet wheel 48 and causing the pawl 50 to engage the ratchet wheel 46. The movement of the weighted element from the FIG. 4 to the FIG. 2 position also causes the finger 88 to lift the leaf 86 (FIG. 5) and rise above the leaf 86, after which the leaf 86 falls back against the lug 85 to the FIG. 2 position.

The disengagement of the pawl 52 from the ratchet wheel 48 enables the spring 40 to retract the body section 10 into the sleeve section 16 to thereby contract the restraint to an adjusted position until the restraint meets resistance from the body of the occupant. The extent of contraction of the restraint is therefore dependent on the girth of the occupant. The engagement of the ratchet 50 with the ratchet wheel 46 prevents the restraint from extending should the occupant lunge against the restraint in case of a sudden stop or an accident.

When the vehicle is stopped and the ignition switch 94 is moved clockwise from the "on" terminal 94b to the "off" terminal 94a, it moves along the terminal 94c so that the electromagnet 80 is energized for a short period of time by being placed in series with the battery 96. The energization of the electromagnet 80 magnetically attracts the bolt head 79 thereto so as to withdraw the tongue 70 from the recess 68 and allow the springs 84 to withdraw the lug 85, together with the leaf 86, out from under the finger 88. The movement of the ignition switch 94 away from the "on" terminal 94b deenergizes the electromagnet 62 to thereby release the prong 18 from the electromagnet 62. The deenergization of the electromagnet 62, by demagnetizing the prong 18, also allows the weighted element 56 to fall away from the prong face 60. Since, at this time, the leaf 86 is not in intersecting relationship with the finger 88, the weighted element 56 falls to such an extent as to disengage the pawl 50 from the ratchet wheel 46 and engage the pawl 52 with the ratchet wheel 48. By mechanism in the hinge 19 shown in the aforementioned application, the release of the prong 18 due to deenergization of the solenoid 62 causes the restraint to swing about the hinge to its open position, shown in phantom in FIG. 1, and causes the pulley 30 to rotate so as to place the sleeve section 16 and the body section 10 in their relatively extended position. The switch 94 remains in contact with the arcuate terminal 94c during its clockwise movement from the terminal 94b to the terminal 94a long enough to hold the tongue 70 in its withdrawn position until the recess 68 has moved upwardly of the tongue.

It is desirable in the operation of the above-described restraint that, in the event of a failure in the electrical system of the vehicle that the restraint remain in the closed FIG. 2 position contracted against the occupant until the occupant is ready to release the restraint. This is accomplished by virtue of the leaf 86 which prevents downward or counterclockwise (FIG. 2) motion of the finger 88 so long as the tongue 70 is engaged in the recess 68, thus retaining the pawl 50 in engagement with the ratchet wheel 46. Thus, so long as the tongue 70 is in the recess 68, the restraint cannot open, and so long as the leaf 86 is beneath the finger 88 to retain the pawl 50 in engagement with the ratchet wheel 46 the restraint cannot be extended. Under these circumstances, in order to release himself from the restraint, the operator need only move the tongue 70 away from the prong 18 manually by means of a knob 100 on the tongue 70 which will enable the restraint to open and will also move the leaf 86 out from under the finger 88 so that the pawl 50 will be disengaged from the ratchet wheel 46, thus enabling the restraint to become extended.

Figure 7:
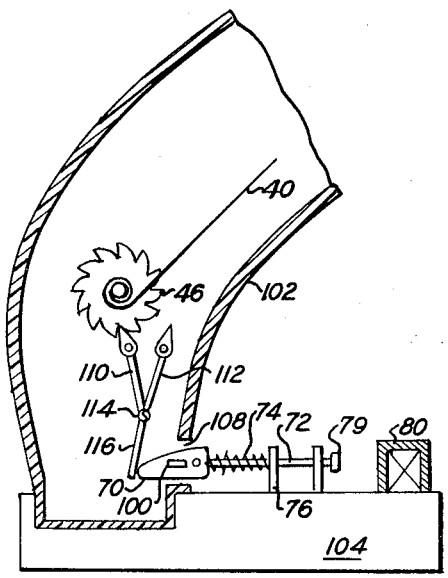
FIG. 7 is a partially sectional view of a modification of the restrant in its closed and contracted position.
Figure 8:
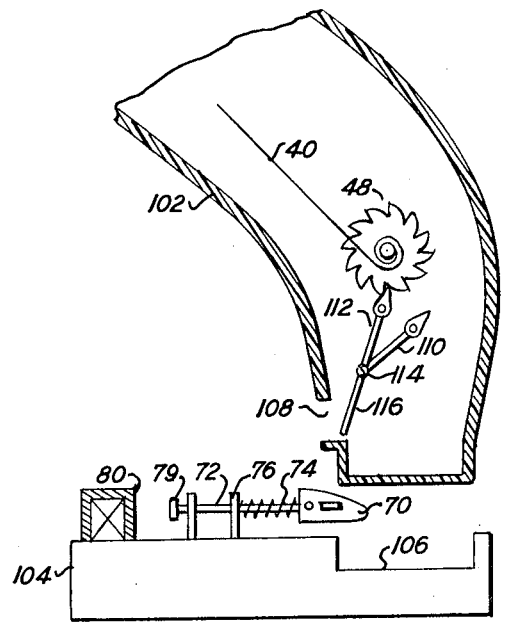
FIG. 8 is a partially sectional view of the restraint of FIG. 7 after it has been released for opening and expansive movement.

FIGS. 7 and 8 show a modification of the restraint wherein the electromagnet 62 is eliminated so that the restraint is held in closed position solely by the tongue 70. Herein, a sleeve section 102 is substituted for the sleeve section 16 and a base 104, secured to the foot plate 64, is substituted for the electromagnet 62 and the frame 78. The base 104 has a recess 106 for receiving the end of the sleeve section 102 and the sleeve section 102 has an opening 108 for receiving the tongue 70. Instead of the pawls 50 and 52, the pawls 110 and 112 are respectively adapted to engage the ratchet wheels 46 and 48 which are rotatably mounted to the sleeve section 102. The pawls 110 and 112 are mounted to a shaft 114 that is journalled in the sleeve section 102 and is spring loaded for counterclockwise motion as seen in FIG. 7 and for clockwise motion as seen in FIG. 8. An arm 116, rigid with the shaft 114, is located in intersecting relationship with the tongue 70.

In the operation of the modification of FIGS. 7 and 8, when the vehicle is standing idle, the restraint is in its open inactive position with its sections 10 and 102 in relatively extended position and the pawl 112 bearing against the ratchet wheel 48 as indicated in FIG. 8. When the occupant sits on the seat 24 and the restraint is swung into closed position, the forward end of the sleeve section 102 is seated against the recess 106 and the restraint is locked in position by the tongue 70 entering the opening 108 as shown in FIG. 7. The entrance of the tongue 70 into the opening 108 causes the tongue 70 to engage the arm 116 and swing it clockwise (FIG. 7) to thereby disengage the pawl 112 from the ratchet wheel 48 and bring the pawl 110 into engagement with the ratchet wheel 46. Similarly to the embodiment of FIGS. 1–6, the disengagement of the pawl 112 from the ratchet wheel 48 enables the spring 40 to contract the restraint to an adjusted position to an extent that is dependent on the girth of the occupant with the engagement of the pawl 110 with ratchet wheel 46 preventing extension of the restraint.

When it is desired to open the restraint, the occupant may, at any time by means of the knob 100, manually move the tongue 70 out of the sleeve section 102 which will cause the spring loaded shaft 114 to move counter-clockwise as seen in FIG. 7 and clockwise as seen in FIG. 8 to disengage the pawl 110 from the ratchet wheel 46 and bring the pawl 112 into engagement with the ratchet wheel 48. This, by the construction described above, causes the restraint to swing about the hinge 19 to its open position with the restraint also moving to its extended position. Alternatively, the tongue 70 may be moved out of the sleeve section 102 to open the restraint by energizing the electromagnet 80 in response to moving the vehicle ignition switch from its "on" to "off" position, as shown in the circuit of FIG. 6 with the electromagnet 62 of this circuit eliminated.

It is noted that, in both the embodiment of FIGS. 1–6 and the embodiment of FIGS. 7 and 8, the movement of the tongue 70 into the sleeve section 16 or 102 operates to prevent the pawl 50 or 110 from disengaging the ratchet wheel 46 and thus locks the restraint in its closed and contracted position, and that the restraint can move to its open and extended position only when the tongue 70 is withdrawn from the sleeve section 16 or 102.

I claim:

1. A restraint assembly comprising: a housing; a tongue spaced from the housing; a restraint formed of a first section mounted to the housing for movement towards and away from the tongue, and a second section mounted to the first section for movement towards and away from the housing and for movement with the first section towards and away from the tongue, whereby movement of the second section with respect to the first section towards the housing contracts the restraint, movement of the second section with respect to the first section away from the housing expands the restraint, movement of both sections towards the tongue closes the restraint, and movement of both sections away from the tongue opens the restraint, the restraint being so constructed as to place the free end of the second section that is remote from the housing in registry with the tongue when the restraint is closed; means mounting the tongue for movement between a disengaged position wherein it is disengaged from said free end when the restraint is open and a locking position wherein it is in engagement with said free end when the restraint is closed to lock the restraint in closed position; means, effective when the restraint is closed, to contract the restraint; restraining means, effective when the restraint is closed, to inhibit its expansion; means responsive to the placement of the tongue in said locking position to render the restraining means effective; and means responsive to the placement of the tongue in said disengaged position to render said restraining means ineffective.

2. The restraint assembly of claim 1 further comprising: a knob on said tongue for effecting manual placement of the tongue in said disengaged position.

3. The restraint assembly of claim 1 further comprising: a prong of magnetic material located interiorly of said second section that is in registry with the tongue when the restraint is closed; a weighted element of magnetic material mounted for movement between a first position spaced from the prong and a second position proximate to the prong; means so connecting the restraining means to the weighted element as to actuate the restraining means when the weighted element is in said second position and to deactuate the restraining means when the weighted element is in said first position; magnetizing means, effective upon actuation when the restraint is closed, to magnetize the prong and thereby move the weighted element from the first position to the second position and effective upon deactuation to permit the weighted element to move from the second position to the first position; a finger mounted to the weighted element for movement therewith; an arm mounted to the prong for movement between an inner position and an outer position; means yieldably urging the arm to its outer position; means responsive to the placement of the tongue in said locking position to move the arm from its outer position to its inner position; and a leaf so mounted to the arm as to permit, when the arm is in said inner position, movement of the finger, together with the weighted element, from the first position to the second position and to preclude the movement of the finger, together with the weighted element, from the second position to the first position while permitting movement of the finger and the weighted element from the second position to the first position when the arm is in its outer position.

4. The restraint assembly of claim 3 further comprising: a vehicle, having an ignition switch, in which the restraint assembly is located; means responsive to the movement of the ignition switch from an "off" position to an "on" position to actuate the magnetizing means; means responsive to the movement of the ignition switch from the "on" position to the "off" position to deactuate the magnetizing means; and means effective during the movement of the ignition switch from the "on" position to the "off" position to move the tongue from its locking position to its disengaged position.

5. The restraint assembly of claim 4 further comprising a bolt of magnetic material secured to the tongue; second magnetizing means, effective upon actuation, to attract the bolt and move the bolt and thereby move the tongue from its locking position to its disengaged position; and means effective during the movement of the ignition switch from the "on" position to the "off" position to actuate the second magnetizing means.

6. The restraint assembly of claim 1 further comprising: a vehicle, having an ignition switch, in which the restraint assembly is located; means responsive to the movement of the ignition switch from an "off" position to an "on" position to actuate the restraining means; and means responsive to the movement of the ignition switch from the "on" position to the "off" position to move the tongue from its locking position to its disengaged position and to deactuate the restraining means.

7. The restraint assembly of claim 1 further comprising: an arm, mounted interiorly of the second section for movement between a first position and a second position, so located in registry with the tongue as to be moved by the tongue, pursuant to the movement of the tongue from its disengaged position to its locking position, from said first to said second position; and means, responsive to the movement of the arm from said first position to said second position, to actuate the restraining means.

8. The restraint assembly of claim 7 further comprising: means yieldably urging the arm to said first position.

9. The restraint assembly of claim 7 further comprising: a shaft, journalled in the second position, rigid with said arm; and means yieldably urging the shaft, together with the arm, to said first position.

10. The restraint assembly of claim 8 further comprising: a vehicle, having an ignition switch, in which the restraint assembly is located; and means effective during the movement of the ignition switch from an "on" position to an "off" position to move the tongue from its locking position to its disengaged position.

11. The restraint assembly of claim 10 further comprising: a bolt of magnetic material secured to the tongue; magnetizing means, effective upon actuation, to attract the bolt and move the bolt and thereby move the tongue from its locking to its disengaged position; and means effective during said movement of the ignition switch to actuate the magnetizing means.

References Cited
UNITED STATES PATENTS

| | | | |
|---|---|---|---|
| 3,190,694 | 6/1965 | Isaac | 297—388 |
| 3,391,961 | 7/1968 | Gardner et al. | 280—150 SB X |
| 3,414,326 | 12/1968 | Raffaelli | 280—150 SB X |
| 3,343,623 | 9/1967 | Porter | 280—150 SB X |
| 3,436,094 | 4/1969 | McKeon | 180—82 X |
| 3,613,819 | 10/1971 | Maloney | 280—150 SB |
| 3,572,832 | 3/1971 | Graham et al. | 297—388 |
| 3,653,714 | 4/1972 | Gentile | 297—388 |
| 3,637,259 | 1/1972 | Rothschild | 297—385 |

KENNETH H. BETTS, Primary Examiner

J. M. McCORMACK, Assistant Examiner

U.S. Cl. X.R.

297—388; 280—150 SB